(12) United States Patent
Sivakumar et al.

(10) Patent No.: US 8,032,596 B2
(45) Date of Patent: Oct. 4, 2011

(54) SYSTEM AND METHOD FOR MANAGING E-MAIL MESSAGES

(75) Inventors: Marimuthu Sivakumar, San Diego, CA (US); Shantharama Handa, Bangalore (IN)

(73) Assignee: Kyocera Corporation, Kyoto (JP)

( * ) Notice: Subject to any disclaimer, the term of this patent is extended or adjusted under 35 U.S.C. 154(b) by 823 days.

(21) Appl. No.: 11/289,020

(22) Filed: Nov. 29, 2005

(65) Prior Publication Data
US 2007/0124390 A1 May 31, 2007

(51) Int. Cl.
*G06F 15/16* (2006.01)
(52) U.S. Cl. .......................... 709/206; 709/219
(58) Field of Classification Search .................. 709/203, 709/206, 207, 228
See application file for complete search history.

(56) References Cited

U.S. PATENT DOCUMENTS

| | | | |
|---|---|---|---|
| 2003/0105825 A1* | 6/2003 | Kring et al. | 709/206 |
| 2005/0193068 A1 | 9/2005 | Brown et al. | |
| 2005/0193070 A1* | 9/2005 | Brown et al. | 709/206 |
| 2005/0204054 A1* | 9/2005 | Wang et al. | 709/232 |
| 2006/0031359 A1* | 2/2006 | Clegg et al. | 709/206 |

FOREIGN PATENT DOCUMENTS

| | | |
|---|---|---|
| EP | 1381193 | 1/2004 |
| WO | WO 00/64110 | 10/2000 |

* cited by examiner

*Primary Examiner* — Ian N Moore
*Assistant Examiner* — Afshawn Towfighi

(57) ABSTRACT

A system for managing the download of e-mail messages is disclosed. The system has an e-mail host holding e-mail messages for download to a recipient's e-mail client. Prior to downloading the messages, the e-mail client uses a message manager to evaluate the characteristics of the communication connection between the e-mail client and it's e-mail host server. Also, the evaluation of the communication connection may be continued while the download is proceeding. Responsive to the evaluation, a message rule is defined or selected according to the characteristics of the communication connection. The selected message rule is applied for downloading the e-mail messages. More particularly, the message rule selects messages for download, formats those messages, and provides for download limitations. The appropriately selected, formatted, and limited e-mail messages are then transmitted to the e-mail client.

16 Claims, 8 Drawing Sheets

| CONNECTION | HEADER | BODY 0.1K | 1K | 5K | UNL | ATTACHMENTS 50K | 500K | 1M | UNL |
|---|---|---|---|---|---|---|---|---|---|
| Unreliable | X | | | | | | | | |
| Slow | X | X | | | | | | | |
| Medium | X | | X | | | X | | | |
| Fast | X | | | X | | | X | | |
| Very Fast | X | | | | X | | | X | |
| Broadband | X | | | | X | | | | X |

FIG. 7

| FILE TYPE | APPLY PROFILE | ALWAYS DOWNLOAD | NEVER DOWNLOAD |
|---|---|---|---|
| Movie | | | X |
| Audio | | | X |
| Document | | X | |
| PDF | X | | |
| Spreadsheet | X | | |
| Image | X | | |
| Animation | | | X |

FIG. 8

| EXCEPTION TYPE ↓227 | APPLY PROFILE ↓229 | ALWAYS DOWNLOAD ↓231 | NEVER DOWNLOAD ↓233 |
|---|---|---|---|
| Person | | | |
|   Bill | | X | |
|   Ron | | | X |
|   Rose | X | | |
| Class | | | |
|   Business | X | | |
|   Personal | | X | |
|   Spam | | | X |
| Domain | | | |
|   @address1.com | | X | |
|   @address2.com | | | X |
| Code | | X | |

FIG. 9

| OPTION TYPE ↓253 | NO ADJUST ↓255 | ADJUST TO 1/2 ↓257 | ADJUST TO ¼ ↓259 | ADJUST TO 2X ↓261 |
|---|---|---|---|---|
| Time | | | | |
|   7am to 7pm | | X | | |
|   7pm to 7am | X | | | |
|   Weekend/Holiday | | | | X |
| Service | | | | |
|   Roaming | | X | | |
|   International | | | X | |
|   Normal | X | | | |
| User | | | | |
|   Julianne | X | | | |
|   Chris | | X | | |
|   Jennifer | | | X | |

FIG. 10

SYSTEM AND METHOD FOR MANAGING E-MAIL MESSAGES

FIELD OF THE INVENTION

The present invention relates generally to the field of e-mail applications, and, more particularly, to a system and method for managing e-mail downloads.

BACKGROUND OF THE INVENTION

E-mail, or electronic mail, is widely used for communicating personal or commercial information. E-mail systems generally comprise an e-mail host that has an associated set of e-mail clients. The e-mail host is typically connected to a wider network for receiving messages from other networks. Most often, the e-mail system uses a TCP/IP network, such as the Internet, for managing and transmitting e-mail messages. An e-mail message typically has header information and a body section. Often, a data file is attached to the e-mail. The header information typically includes addressing information, routing information, and information related to the size and content of the body and any attachments. The header information typically has no more than a few hundred bytes of information, while the body may contain hundreds to thousands of bytes of information. Most often, larger files are sent as attachments to the e-mail. With the proliferation of multimedia applications, these attachment files may be very large. For example, image and video files may be several megabytes in size.

When sending an e-mail message to a particular recipient, the e-mail originates from a sender, and enters the e-mail system through that sender's e-mail host. Through a series of store and forward network servers, the e-mail message is directed to the e-mail host server for the intended recipient. The e-mail message is held at the recipient's e-mail host server until the e-mail recipient's client connects to the e-mail host. Upon connection, the e-mail message is typically downloaded to the e-mail client. In some cases, the user of the e-mail client may specify that only limited information should be downloaded upon connection. For example, some host applications enable the host to be configured to send only header information upon connection. In this way, header information may be downloaded to the e-mail client, and the user may review the header information to select particular e-mails to fully download. This is particularly important when the user accesses the e-mail host through a relatively slow or unreliable connection. With such a slow or unreliable connection, a large attachment file may take several minutes or even hours to download. Rather than download such a large attachment using a slow connection, a user may prefer to move to a device with a faster connection, and download the attachment more efficiently at a later time.

Many users today have multiple devices for accessing their e-mail host account. Some of these devices may operate very fast, such as an office computer connected to a DSL or broadband connection. Other devices, such as portable computers or wireless handsets, may connect at much slower speeds. Some devices may even connect at different speeds depending upon network condition or geographic location. For example, some wireless service providers enable high data rate connections in certain geographic locations, but then revert to slower connection speeds under high demand conditions, or when the user moves out of the enhanced service area. In this way, the user may not be able to predict connection speed for a particular device. Also, the e-mail host may have a default download configuration for one type of device, and when a user connects with a slower device, finds that the slow connection is overwhelmed with large message downloads. Accordingly, there is a need for a system and method for more effectively managing the download of e-mail messages.

SUMMARY OF THE INVENTION

Briefly, the present invention provides a system for managing the download of e-mail messages. The system has an e-mail host holding e-mail messages for download to a recipient's e-mail client. Prior to downloading the messages, the e-mail client uses a message manager to evaluate the characteristics of the communication connection between the e-mail client and it's e-mail host server. Also, the evaluation of the communication connection may be continued while the download is proceeding. Responsive to the evaluation, a message rule is defined or selected according to the characteristics of the communication connection. The selected message rule is applied for downloading the e-mail messages. More particularly, the message rule selects messages for download, formats those messages, and provides for download limitations. The appropriately selected, formatted, and limited e-mail messages are then transmitted to the e-mail client.

In one particular example, the present invention provides a wireless mobile handset operating an e-mail client system. The wireless handset communicates to an e-mail host through a wireless infrastructure system provided by a wireless service provider. When the e-mail client connects to the e-mail host server, the e-mail client has a message manager which evaluates the communication connection between the e-mail client and the e-mail host server. For example, the communication connection may be evaluated for speed, quality, or active hardware. Responsive to the evaluation, a message rule is defined or selected according to the current communication conditions. The rule is applied to appropriately formats and limit e-mail messages. The appropriately formatted and limited e-mail messages are then downloaded to the e-mail client. A user of the e-mail client may set exceptions and override options to adjust the message rule for particular needs. Also, the message manager may continually or periodically evaluate the communication connection during a download, and dynamically adjust message download rules.

Advantageously, the system for managing download messages enables an e-mail client to automatically format and limit e-mail messages according to current communication characteristic. In this way, the e-mail client is enabled to adjust its e-mail messaging configuration to more effectively download and present e-mail messages.

BRIEF DESCRIPTION OF THE DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

FIG. 7 is a table illustrating a communication profile for a message rule in accordance with the present invention.

FIG. 8 is a table illustrating a set of user exceptions for a message rule in accordance with the present invention.

FIG. 9 is a table illustrating a set of user exceptions for a message rule in accordance with the present invention.

FIG. 10 is a table illustrating a set of user options for a message rule in accordance with the present invention.

DETAILED DESCRIPTION OF THE PREFERRED EMBODIMENTS

Figure 1:
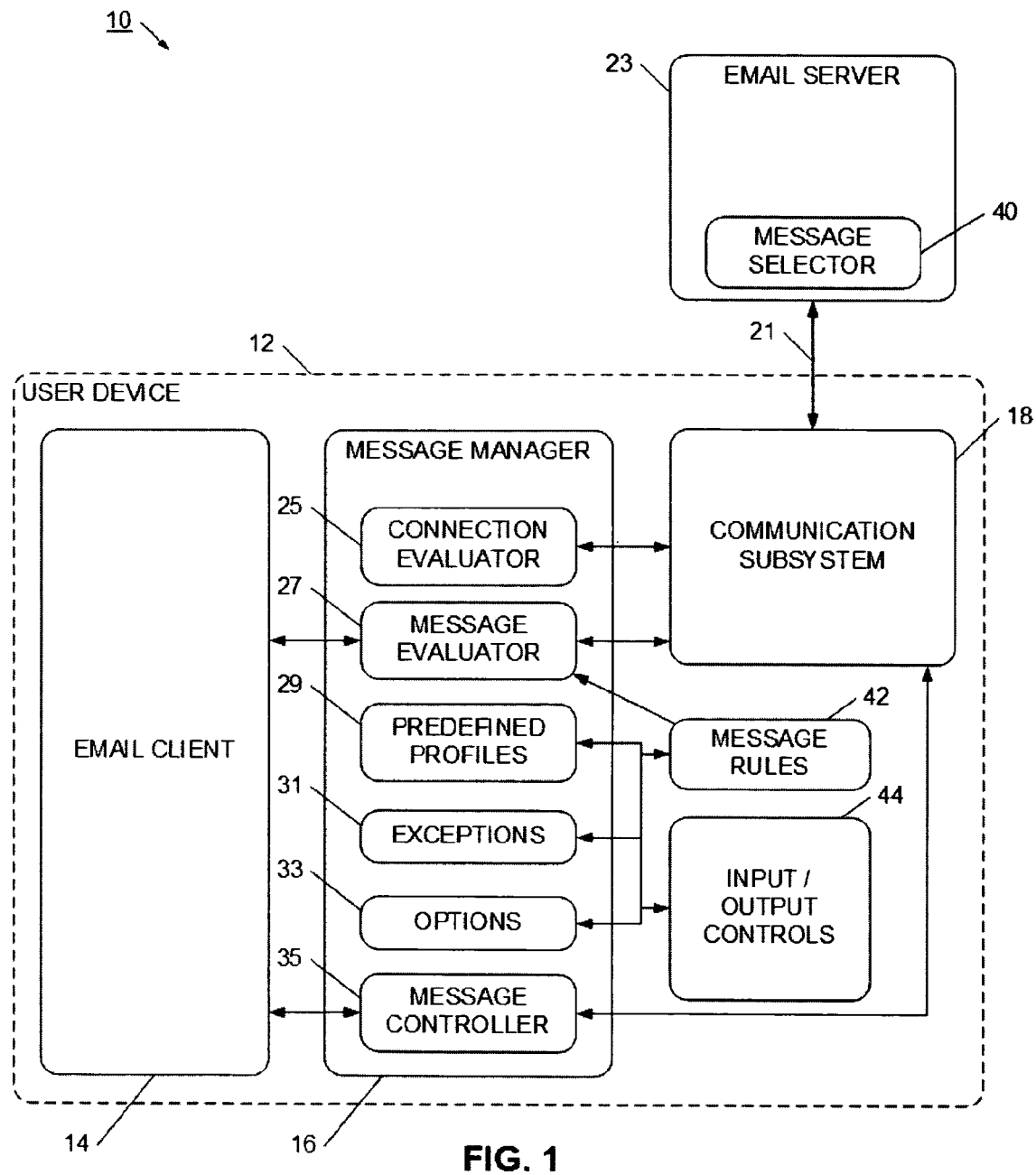
FIG. 1 is a block diagram of a system for managing e-mail messages in accordance with the present invention.

Referring now to FIG. 1, system 10 for managing e-mail messages is illustrated. System 10 includes user device 12 which operates e-mail client process 14. User device 12 may be, for example, a computer system, a portable computer, a personal data assistant, a mobile wireless handset, a text pager, or other computing device. It will be appreciated that user device 12 may be a stand-alone device, or may be incorporated within a larger system. User device 12 has communication connection 21 for connecting user device 12 and e-mail host server 23. Communication connection 21 may be a wired or a wireless connection. In one example, communication connection 21 is a wireless connection compliant with one of the communication standards such as CDMA, WCDMA, CDMA2000, UMTS, PHS, GSM, EDGE, or other standard. In another example, communication connection 21 may be a wired connection, such as an Ethernet connection or another connection compliant with the TCP/IP protocols. E-mail server 23 operates an e-mail hosting application for receiving and directing e-mail messages. E-mail server 23 may have message selector process 40 for selectively forwarding messages to a particular e-mail client. Generally, e-mail server 23 couples to a wider network and receives e-mail messages addressed to its respective set of e-mail clients. When a user device connects to the e-mail host, the e-mail server initiates message transfer according to message selector 40. For example, message selector 40 may be set to download automatically only e-mail message headers. In this way, traffic is minimized on communication connection 21, as only header information is transferred to e-mail client 14.

User device 12 has communication subsystem 18 for establishing communication with e-mail server 23. The design and construction of communication subsystems is well-known, and therefore will not be discussed in detail. User device 12 also includes message manager 16. Message manager 16 cooperates with communication subsystem 18 and e-mail client 14 to improve e-mail system performance by intelligently and adaptively downloading e-mail messages. When user device 12 connects to e-mail server 23 through communication subsystem 18, connection evaluator 25 evaluates the characteristics of communication connection 21. For example, connection evaluator 25 may detect the particular hardware arrangement used by communication subsystem 18. In some user devices, a user may be allowed to specify device settings or include or remove hardware in communication subsystem 18. In one example, a portable computer may accept a wireless network card operating at one of several standards. Connection evaluator 25 may detect which specific card is being used, and adapt to the specifications employed by the standard or set by the user. Connection evaluator 25 may also detect the speed of communication connection 21. Speed may be detected in a variety of ways. In one example, connection evaluator 25 extracts connection speed from parameters exchanged during a handshaking process. In another example, connection evaluator 25 may operate an upload or download test to determine connection speed. Connection evaluator 25 may also evaluate the quality of communication connection 21. Connection quality generally relates to the number of errors or error rate, and the number of packets that need to be resent. Such quality information may be extracted from available communication parameters, or may be evaluated by a sending and receiving test packets. It will be appreciated that other methods may be used to characterize communication connection 21. By evaluating the available hardware, the available speed, and the available communication quality, connection evaluator 25 can evaluate the characteristics of communication subsystem 18 and it's communication link to e-mail server 23.

Message manager 16 has predefined communication profiles 29 for specifying how e-mail messages are to be downloaded to e-mail client 14. Profiles 29 are associated with particular communication connection characteristics. For example, one profile may specify that an e-mail message of unlimited size and unlimited attachments may be downloaded when a broadband communication connection is detected. However, another profile may specify that only a portion of an e-mail body is to be downloaded, and no attachments are to be downloaded, when a slow or unreliable communication connection has been detected. User device 12 may have default profiles assigned, and may allow a user to change or adjust profiles for particular purposes. In one example, a user may specify exceptions 31 to the default or predefined profiles 29. Exceptions 31 may specify, for example, the blocking of all e-mail messages from particular users or domain names, or may specify the disabling of limitations for other specific users, domains, or file types. It will be appreciated that may types of exceptions and exception categories may be used. In another example, a user may specify options 30 for downloads. Options 33 may include limiting downloads during peak pricing periods, while roaming, or when operating through an international network.

Predefined profiles 29, exceptions 31, and options 33 are used to define message rules 42. Message rules 42 therefore provide guidance and instructions on types and sizes of e-mail messages to download according to the current communication connection. More particularly, message rules 42 are used by message evaluator 27 in deciding how to download e-mail messages. Message evaluator 27 receives e-mail header information that has been downloaded from e-mail server 23. The header information generally includes information regarding who the e-mail message is from, the size of the message body, and the size and type of any attachments. Message evaluator 27 takes the header information and applies the appropriate message rule from message rules 42. The appropriate message rule 42 is selected responsive to the results of the connection evaluation. For example, if the connection evaluation determined that communication connection 21 is a broadband connection, then message evaluator 27 applies a message rule associated with a broadband connection. If however communication connection 21 was evaluated to be a slow connection, then a message rule associated with a slow connection would be applied to the e-mail message. After applying the appropriate message rule, message evaluator 27 generates instructions directed to e-mail server 23 for specifying how each e-mail message is to be downloaded. The message instructions are passed through message controller 35 and communication subsystem 18 to e-mail server 23. E-mail server 23 receives the instructions, and uses message selector 40 to properly format and limit e-mail messages according to the instructions. E-mail server 23 then downloads the formatted e-mail messages to e-mail client 14.

In some cases, the user may desire to provide additional input or override default conditions, and may use input/output controls 44 for interactive adjustment of e-mail message download. Also, message manager 16 may provide dynamic adjustment during e-mail download. In this way, connection evaluator 25 continually or periodically evaluates communication connection 21 and the communication subsystem 18 to determine current communication conditions. Responsive to the current conditions, message manager 16 may apply a new profile and its associated rule. For example, if a fast connection was evaluated prior the start of message download, a rule may have been applied to allow very large e-mail attachments to download. During download, the connection speed or quality may drop, which may be detected by connection evaluator 25. A new rule may be applied, which interrupts downloads of large attachments, and restricts downloading to smaller files or messages. Then, when connection evaluator 25 detects that normal broadband speed and quality has returned, the file may continue to download. In this way, message manager 16 may dynamically adjust download profiles and rules before and during download to react to the most current communication conditions.

Figure 2:
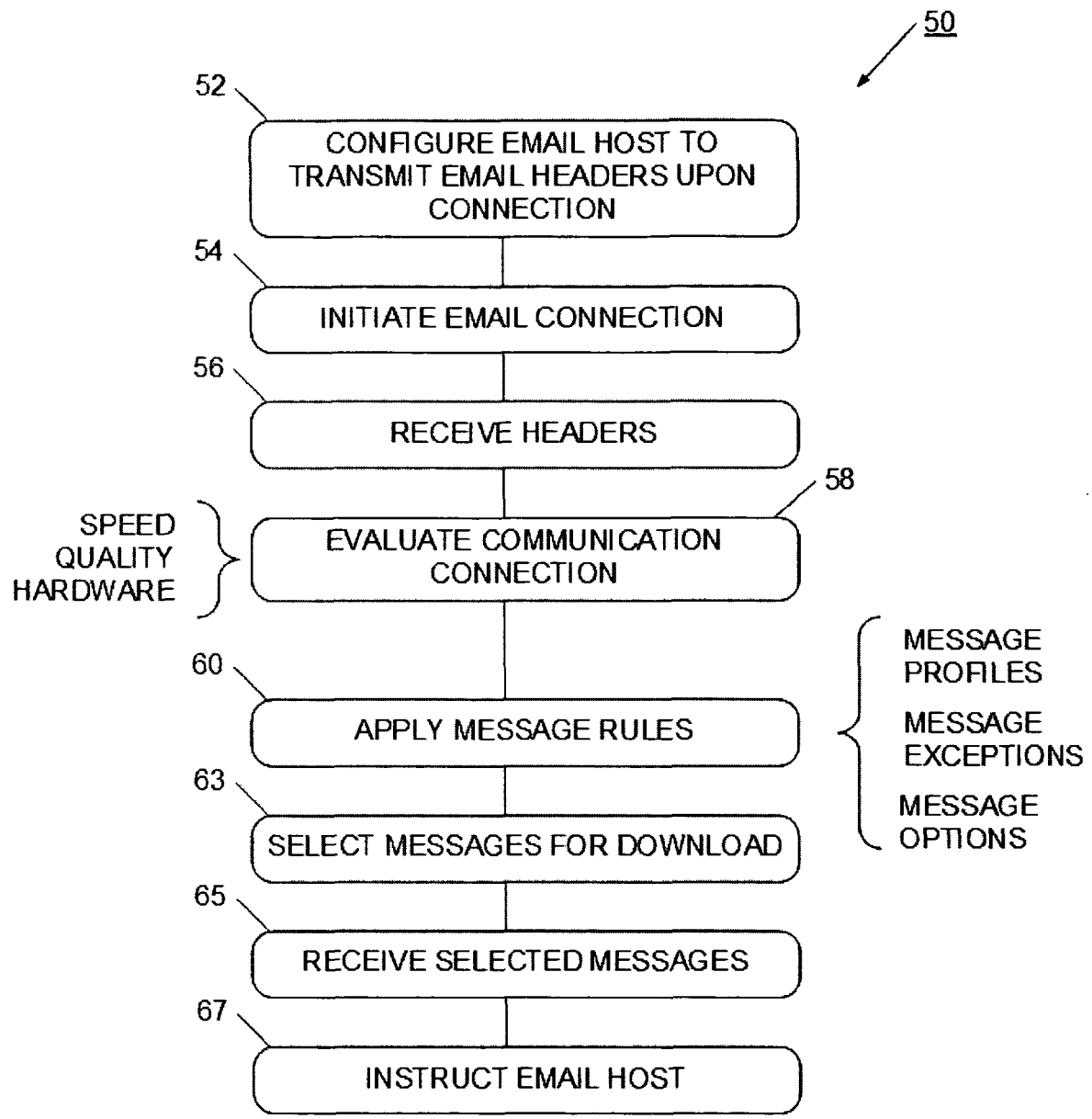
FIG. 2 is a flowchart of a process for managing e-mail messages in accordance with the present invention.

Referring would now to FIG. 2, method 50 for managing e-mail messages is illustrated. Method 50 has an e-mail server that is configured to transmit e-mail headers to an e-mail client upon connection as shown in block 52. In this way, upon an e-mail client connecting to its e-mail server as shown in block 54, the e-mail server downloads header information for all e-mails addressed to that particular e-mail client. The e-mail header information typically includes an indication of who sent the e-mail message, the size of the body of the e-mail message, and the size and type of all available attachments. It will be appreciated that other types of information may be included within the header. The e-mail client receives the header information as shown in block 56. The e-mail client also has a message manager that evaluates the communication connection as shown in block 58. The communication connection may be characterized as the speed, quality, or installed hardware. The communication connection may be evaluated during the time the header information is being transferred, one may be done at a different time. For example, the communication connection may be evaluated when the e-mail client is activated, or prior to initiating a message download. In another example, the communication connection may be evaluated concurrently with a download. Such a continual evaluation enables dynamic adjustment and reaction to changes in the communication connection.

The message manager also has a set of message rules. These message rules are generated according to message profiles that set out how new messages are to be handled under different communication connection capabilities. These profiles may be adjusted with user defined exceptions and options. Together, the profiles, exceptions, and options cooperate to create message rules. Dependent on the outcome of the evaluation of the communication connection, the message manager selects a particular rule most closely associated with the detected communication characteristics. As shown in block 60, the message manager applies the rules to the header information. For example, if the communication connection is evaluated to be unreliable, then a rule may be used that causes no e-mail message information to be further transmitted. In another example, if the communication connection is evaluated to be very fast, then all of the e-mail body text may be downloaded, and an unlimited number and size of attachments may also be downloaded. In this way, the type and size of messages is selected for download is shown in block 63. The message manager generates message instructions on how to properly format, limit, and transmit the e-mail messages, and transmits the instructions to the e-mail server as shown in block 65. The e-mail server receives the message instructions, and operates a process to properly select, format, and limit the e-mail messages for download. The e-mail server then downloads the selected messages to the e-mail client where the messages are received as shown in block 67.

Figure 3:
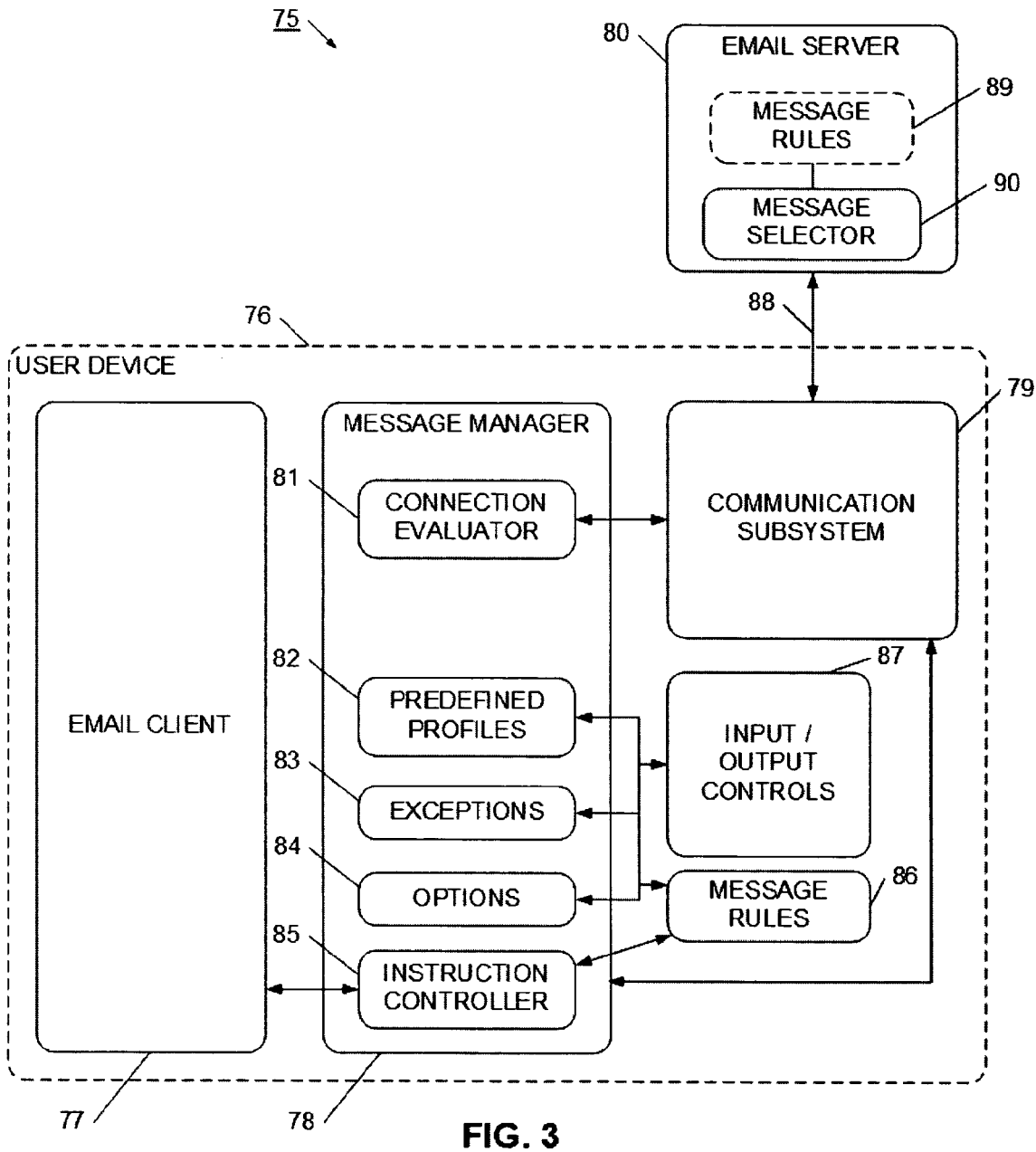
FIG. 3 is a block diagram of a system for managing e-mail messages in accordance with the present invention.

Referring now to FIG. 3 system 75 for managing e-mail messages is illustrated. System 75 includes user device 76 which operates e-mail client process 77. User device 76 may be, for example, a computer system, a portable computer, a personal data assistant, a mobile wireless handset, a text pager, or other computing device. It will be appreciated that user device 76 may be a stand-alone device, or may be incorporated within a larger system. User device 76 has communication connection 88 for connecting user device 76 and e-mail server 80. Communication connection 88 may be a wired or a wireless connection. E-mail host 80 operates an e-mail hosting application for receiving and directing e-mail messages. E-mail host 80 may have message selector process 90 for selectively forwarding messages to a particular e-mail client. Generally, e-mail server 80 couples to a wider network and receives e-mail messages addressed to its respective set of e-mail clients. When user device 76 communicates with e-mail server 80, message selector 90 downloads messages according to specific instructions received from the e-mail client. Accordingly, no messages or headers are downloaded until specific instructions are received at the e-mail server 80.

User device 76 has communication subsystem 79 for establishing communication with e-mail host 80. The design and construction of communication subsystems is well-known, and therefore will not be discussed in detail. User device 76 also includes message manager 78. Message manager 78 cooperates with communication subsystem 79 and e-mail client 77 to improve e-mail system performance by intelligently and adaptively downloading e-mail messages. When user device 76 connects to e-mail host 80 through communication subsystem 79, connection evaluator 81 evaluates the characteristics of communication connection 88. For example, connection evaluator 81 may detect the particular hardware arrangement used by communication subsystem 79. In some user devices, a user may be allowed to specify device settings or include or remove hardware in communication subsystem 79. In one example, a portable computer may accept a wireless network card operating at one of several standards. Connection evaluator 81 may detect which specific card is being used, and adapt to the specifications employed by the standard.

Connection evaluator 81 may also detect the speed of communication connection 88. Speed may be detected in a variety of ways. In one example, connection evaluator 81 extracts connection speed from parameters exchanged during a handshaking process. In another example, connection evaluator 81 may operate an upload or download test to determine connection speed. Connection evaluator 81 may also evaluate the quality of communication connection 88. Connection quality generally relates to the number of errors or error rate, and the number of packets that need to be resent. Such quality information may be extracted from available communication parameters, or may be evaluated by a sending and receiving test packets. It will be appreciated that other methods may be used to characterize communication connection 88. By evaluating the available hardware, the available speed, and the available communication quality, connection evaluator 81 can evaluate the characteristics of communication subsystem 79 and it's communication link to e-mail server 80.

Message manager 78 has predefined communication profiles 82 for specifying how e-mail messages are to be downloaded to e-mail client 77. Profiles 82 are associated with particular communication connection characteristics. For example, one profile may specify that an e-mail message of unlimited size and unlimited attachments may be downloaded when a broadband communication connection is detected. However, another profile may specify that only a portion of an e-mail body is to be downloaded, and no attachments are to be downloaded, when a slow or unreliable communication connection has been detected. User device 76 may have default or predefined profiles assigned, and alos may allow a user to change or adjust profiles for particular purposes. In one example, a user may specify exceptions 83 to predefined profiles 82. Exceptions 83 may be, for example, blocking e-mail messages from particular users or domain names from downloading, or disabling limitations for other specific users, domains, or file types. In another example, a user may specify options 84 for downloads. Options 84 may include further download limitations during peak pricing periods, while roaming, or when operating through an international network.

Predefined profiles 82, exceptions 83, and options 84 are used to define a set of message rules 86. Message rules 86 therefore provide guidance and instructions on types and sizes of e-mail messages to download according to the current communication connection. The appropriate one of the message rules 86 is selected responsive to the results of the connection evaluation. For example, if the connection evaluation determined that communication connection 88 is a broadband connection, then instruction controller 85 selects or generates the message rule associated with a broadband connection. If however communication connection 88 was evaluated to be a slow connection, then a message rule associated with a slow connection would be selected or generated. After selecting or generating the appropriate message rule, instruction controller 85 generates instructions directed to e-mail server 80 for specifying how e-mail messages are to be downloaded. The message instructions are passed through communication subsystem 79 to e-mail server 80. E-mail server 80 receives the instructions, and uses message selector 90 to properly select, format and limit e-mail messages according to the instructions. E-mail server 80 then downloads the formatted e-mail messages to e-mail client 77.

In some cases, the user may desire to provide additional input or override default conditions, and may use input/output controls 87 for interactive adjustment of e-mail message download. Also, message manager 78 may provide dynamic adjustment during e-mail download. In this way, connection evaluator 81 continually or periodically evaluates communication connection 88 and the communication subsystem 79 to determine current communication conditions. Responsive to the current conditions, message manager 78 may apply a new profile and its associated rule. For example, if a fast connection was evaluated prior the start of message download, a rule may have been applied to allow very large e-mail attachments to download. During download, the connection speed or quality may drop, which may be detected by connection evaluator 81. A new rule may be applied, which interrupts downloads of large attachments, and restricts downloading to smaller files or messages. Then, when connection evaluator 81 detects that normal broadband speed and quality has returned, the file may continue to download. In this way, message manager 78 may dynamically adjust download profiles and rules before and during download to react to the most current communication conditions.

Figure 4:
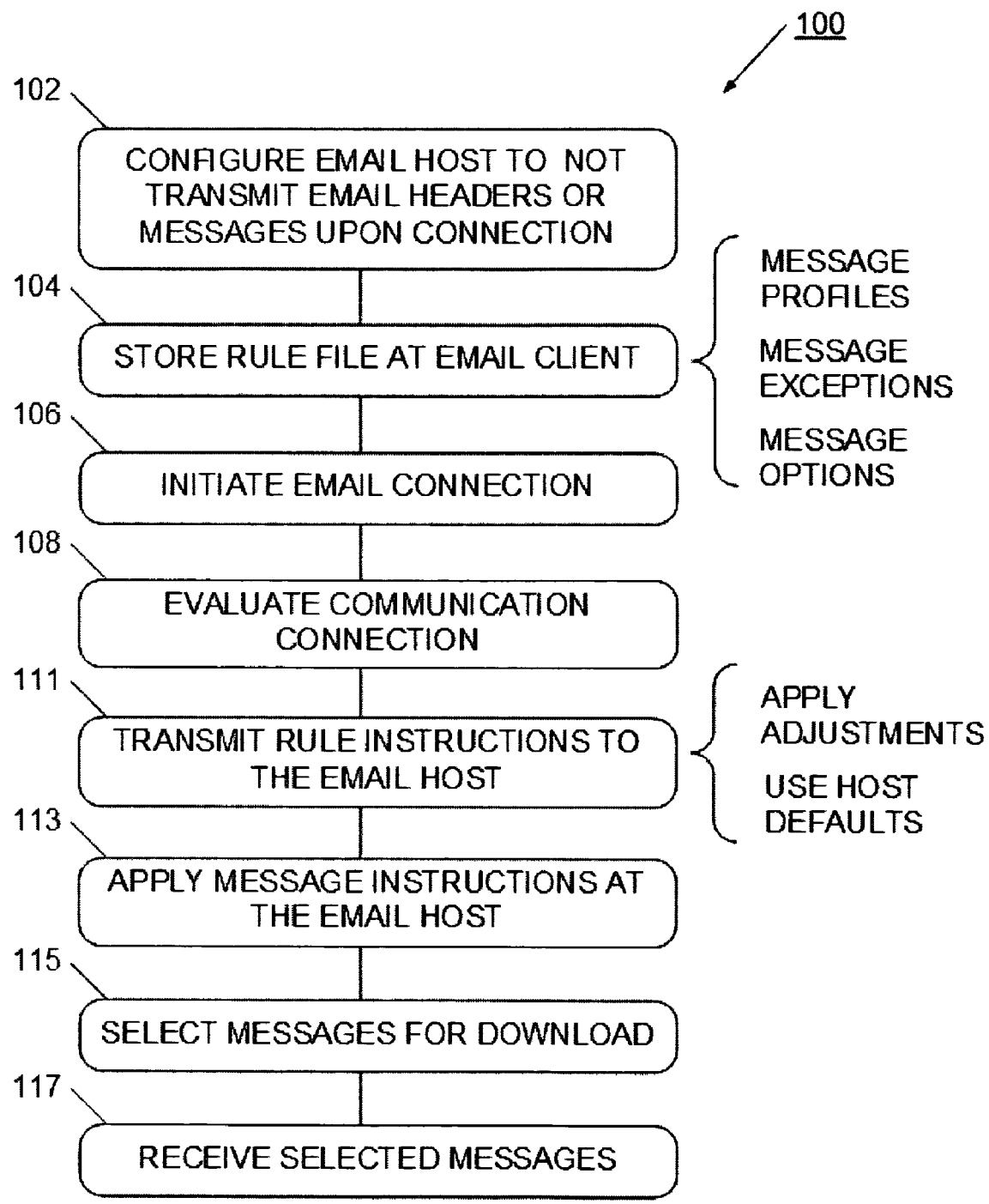
FIG. 4 is a flowchart of a process for managing e-mail messages in accordance with the present invention.

Referring now to FIG. 4, method 100 for managing e-mail messages is illustrated. Method 100 has an e-mail server that is configured not to automatically transfer e-mail headers to an e-mail client upon connection. In this way, when an e-mail client connects to the e-mail server, the e-mail server waits for specific download instructions prior to downloading any e-mail messages, as shown in block 102. A message rule file is stored at the e-mail client as shown in block 104. The rule file is generated or selected according to message profiles specific to particular communication connection characteristics. These message profiles may be adjusted with user-defined exceptions and options. When an e-mail client desires to receive e-mail messages, the e-mail client connects to the e-mail server as shown in block 106. At time of connection, at a previous time, or during download, a message manager evaluates characteristics of the communication connection as shown in block 108. For example, the communication connection may be evaluated for speed, quality, or available hardware.

Once the characteristics of the communication connection are understood, the characteristics of the communication connection are used to select or generate an appropriate message rule. More particularly, the selected message rule is associated with the connection characteristics as evaluated in block 108. The message manager in the e-mail client generates a set of rule instructions arranged in a format for use by the e-mail host as shown in block 111. A user may apply adjustments such as exceptions and options, or use defaults set at the e-mail server. The e-mail server then applies the message instructions as shown in block 113. In this way, the e-mail server selects particular messages for download, and provides instructed limitations to download sizes and types as shown in block 115. A set of properly selected, formatted, and limited e-mail messages is then received at the e-mail client and shown in block 117.

Figure 5:
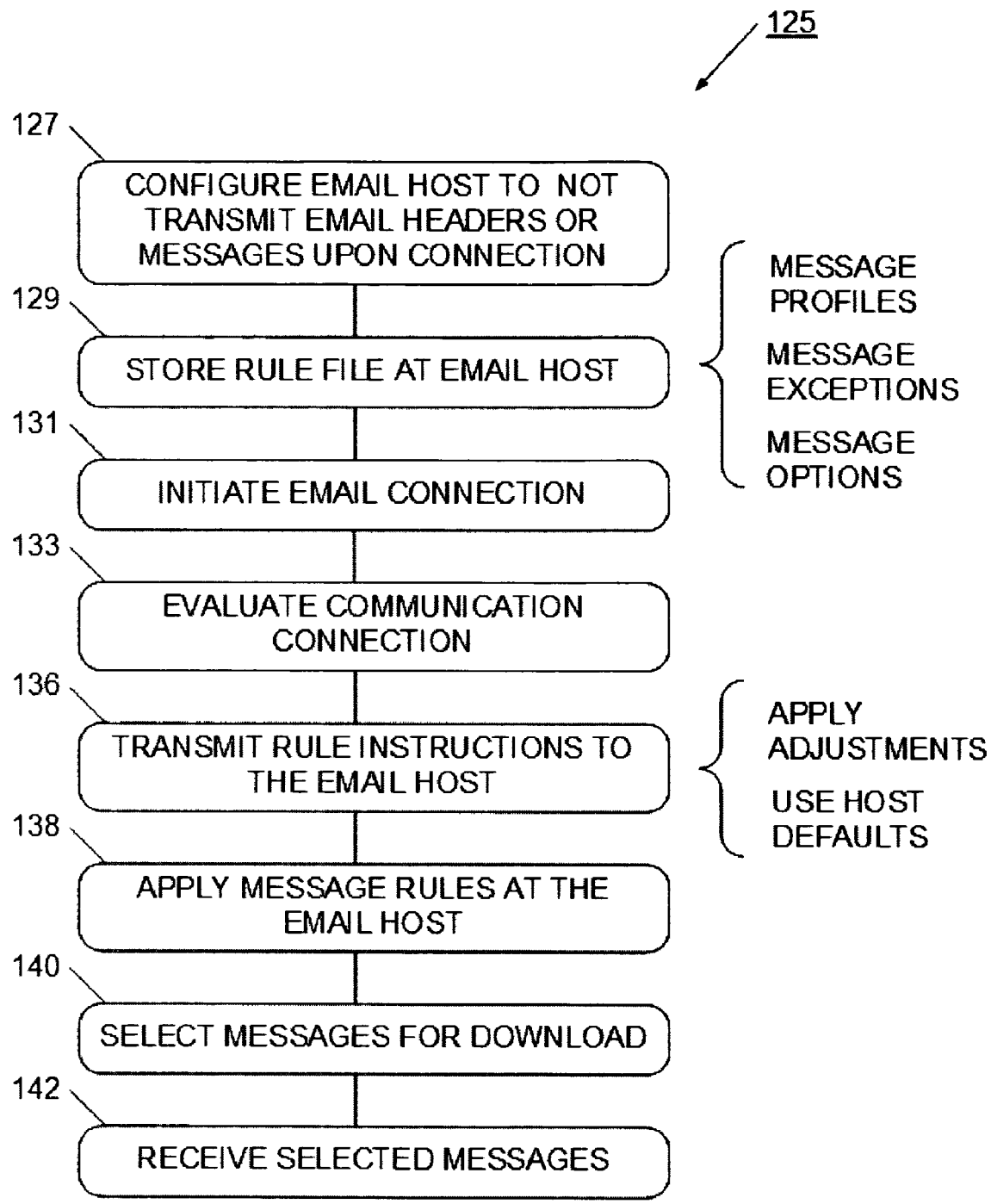
FIG. 5 is a flowchart of a process for managing e-mail messages in accordance with the present invention.

Referring again to FIG. 3, an alternative arrangement will be described. In the alternative arrangement, message rules 89 may be stored on the e-mail server 80 as shown in block 89. Message rules 89 may be predefined from the e-mail server side, or may be defined in user device 76 and communicated to e-mail server 80. In this way, the e-mail server 80 becomes responsible for applying message rules 89 to e-mail messages. Referring now to FIG. 5, method 125 for managing e-mail messages is described. Method 125 has an e-mail server that is configured not to automatically transfer e-mail headers to an e-mail client upon connection. In this way, when an e-mail client connects to the e-mail server, the e-mail server waits for specific download instructions prior to downloading any e-mail messages, as shown in block 127. The e-mail server has a message rule file as shown in block 129. This message rule file may have been developed by processes operating at the e-mail server, or may be generated at a user device and uploaded to the e-mail server. The rule file includes message profiles specific to particular communication connection characteristics. These profiles may be adjusted with user-defined exceptions and options.

When an e-mail client desires to receive e-mail messages, the e-mail client connects to the e-mail server as shown in block 131. At time of connection, or at a previous time, or during download, a message manager on the user device evaluates characteristics of the communication connection as shown in block 133. For example, the communication connection may be evaluated for speed, quality, or available hardware. Once the characteristics of the communication connection are transmitted to the e-mail server, the characteristics of the communication connection are used by the e-mail server to select an appropriate message rule. More particularly, a rule instruction is transmitted from the e-mail client to the e-mail server as shown in block 136. This rule instruction includes information regarding the outcome of the evaluation of the communication connection. The rule instruction has sufficient information to enable the e-mail server to select the appropriate one of the message rules to apply for the current communication connection. Once the e-mail server becomes aware of the quality of the communication connection, the e-mail server then applies the appropriate message rule as shown in block 138. Using the selected message rule, the e-mail server then selects, formats, and appropriately limits the e-mail messages for downloading as shown in block 140. The download messages are then received at the e-mail client as shown in block 142.

Figure 6:
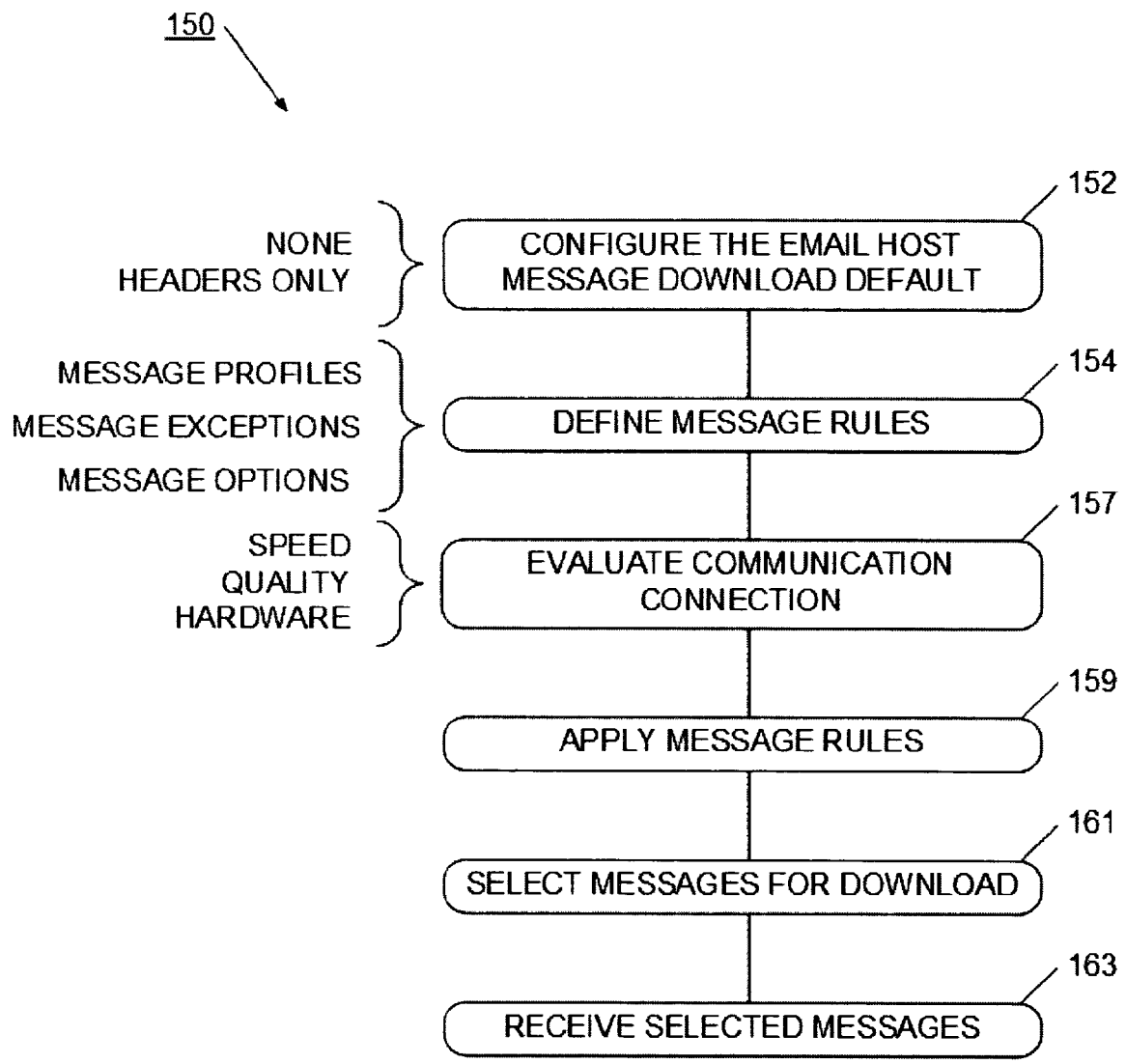
FIG. 6 is a flowchart of a process for managing e-mail messages in accordance with the present invention.

Referring now to FIG. 6, method 150 for managing e-mail messages is illustrated. Method 150 has an e-mail host configured to download e-mail messages upon specific instruction, or in another arrangement, to automatically download header information upon connection, as shown in block 152. A set of message rules has been defined as shown in block 154. These message rules are defined to provide selection, formatting and limitation instructions responsive to an evaluation of the communication connection. These message rules, depending upon the specific application, may be defined in the user device, at the e-mail host, or on another device. These message rules may also be stored at the local device, or may be stored at the e-mail server, or on another device. It will also be appreciated that these message rules may be adapted automatically, or may have exceptions and options specified by a user. During connection to the e-mail server, the e-mail client causes the communication connection to be evaluated as shown in block 157. The evaluation may include evaluating speed, quality, and hardware characteristics for the communication connection. Depending on the outcome of the evaluation, an appropriate message rule is selected. That message rule is applied to the available e-mail messages, as shown in block 159. E-mail messages are then selected, formatted, and appropriately limited for download as shown in block 161. The downloaded messages are then received at the e-mail client as shown in block 163.

Referring now to FIG. 7, communication profile 175 is illustrated. Communication profile 175 provides instructions as to how e-mail messages are to be selected, formatted, and limited according to the evaluated communication connection. Communication profile 175 defines six levels of connection characteristics 177. It will be appreciated that more or fewer connection levels may be specified. For each of the defined connection levels 177, communication profile 175 shows how header 179, body 181, and attachments 183 are to be selected, formatted, and limited. For example, if the connection is found to be "unreliable", then only the header information is downloaded as an e-mail message. If the connection is found to be "slow", then the header and the first 0.1 kbytes of the body are downloaded. For both the "unreliable" and "slow" connection levels, no attachments will be download. As shown in FIG. 7, as connection level improves, additional body text may be downloaded, as well as additional attachment information. For example, when the connection level is determined to be "broadband", then the header, full body, and an unlimited number and size of attachments will be downloaded. It will be appreciated that the connection levels may be defined according to connection speed, connection quality, active hardware, or a combination of these factors. It will also be appreciated that other factors may be used in defining connection level.

Referring now to FIG. 8, an example of user exceptions 200 is illustrated. User exceptions 200 act to adjust default values set in the communication profile. In particular, user exceptions 200 are made according to file type 202. Several types of file types are defined, with exception adjustments associated with some of the file types. For example, any file type that is a "document" type will always downloaded 206. However, a file type of "movie" or "audio" will never download 208. Other file types, such as "image" will use the default communication profile. It will be appreciated that many other types of user exceptions may be used. For example, referring to FIG. 9, other user exceptions 225 are illustrated. User exceptions 225 define exceptions based on the particular person sending an e-mail, the class of the e-mail, a particular domain name, or a special code inserted in the e-mail. For example, an e-mail from a particular person may simply apply an existing default profile 229, always download a message from that person 231, or never download 233 an e-mail message from that person. In a similar manner, many user devices have an address book that allow contacts to be classified as "business" or "personal". Similar to the personal exceptions applied above, class exceptions allow for application of the default download, an "always download" condition, or a "never download" condition. It will be appreciated that other classes may be used, and that other types of adjustments or limitations may be made. Particular e-mail domains may also be excepted from default communication profile as illustrated in FIG. 9. Finally, an exception of may be made for an e-mail containing a particular code. In this way, a user name provide a code that, irrespective of any relevant limitation, will force an override exception where that e-mail will always download. Such a code would be useful for assuring that e-mail messages were received in an emergency or critical situation.

Referring now to FIG. 10, a set of user options 250 is illustrated. User options 250 enable a user to adjust the default communication profile according to time, type of service, and particular senders. It will be understood that many other option types 253 may be used. For each of option types 253, the user is allowed to select no adjustment 255 to the default profile, to adjust the download limitations by one-half 257, to adjust the downloaded by one-fourth 259, or to adjust the download limitation by a multiplication factor 261 of 2. For example, when the user is in a "roaming" service, the user can request that download limitations be adjusted by one-half. In this way, the expenses incurred during roaming may be reduced. In another example, on weekends and holidays, when downloading may be free, the limitation may be adjusted upward by a factor of 2. It will be appreciated that many other options and adjustments may be used.

While the invention has been described in connection with a number of embodiments, it is not intended to limit the scope of the invention to the particular forms set forth, but on the contrary, it is intended to cover such alternatives, modifications, and equivalents as may be included within the scope of the invention.

What is claims is:

1. A method for managing e-mail messages according to a set of message rules, the method comprising:

detecting a connection speed between an e-mail client and an e-mail server over a communication connection, the e-mail server having an e-mail message addressed for delivery to the e-mail client;

evaluating a quality of communication connection and the communication connection to determine connection characteristics, wherein the quality of communication connection comprises an error rate for packets and a quantity of resent packets, wherein the evaluating step is performed periodically at regular intervals during the communication connection;

creating the set of message rules at the e-mail client, wherein the set of message rules includes, a predefined communication profile that includes a plurality of different connection levels that are associated with the connection speed, wherein one of the connection levels includes an unreliable connection level and a broadband connection level, the communication profile configured to provide instructions as to how e-mail messages are to be selected, formatted, and limited according to the connection speed, a predefined file type user exception to the predefined communication profile that overrides the communication profile based on the type of attachment in the e-mail message, a predefined user option exception to the predefined communication profile that overrides the communication profile, wherein the user option exception is based on a particular person sending the e-mail message;

selecting the set of message rules from the e-mail client and communicating the message rules to the e-mail server to specify how each e-mail is to be downloaded;

applying the selected message rules to the e-mail message at the e-mail server; and transmitting the e-mail message from the e-mail server to the e-mail client according to the selected message rules; and dynamically adjusting the selecting, applying and transmitting steps during e-mail download in response to the periodic evaluation during the communication connection, wherein at least one portion of the e-mail download is interrupted when the selected set of message rules indicate that the portion of the e-mail is not to be downloaded at the evaluated quality of the communication connection, the portion of the e-mail download continued when the selected set of message rules indicate that the portion of the e-mail is to be downloaded at the evaluated quality of the communication connection.

2. The method according to claim 1, wherein the applying step further comprises limiting the e-mail message to only its header information.

3. The method according to claim 1, wherein the applying step further comprises limiting the size of the body of the e-mail message.

4. The method according to claim 1, wherein the applying step further comprises limiting the number or size of attachments to the e-mail message.

5. The method according to claim 1, wherein the evaluating step is performed responsive to the e-mail client connecting to the e-mail server.

6. The method according to claim 1, wherein the user exception further comprises a particular domain name associated with the message rule.

7. A method for operating a message manager on a communication client, the message manager operating the steps of:

transferring an e-mail message header from an e-mail server to an e-mail client, wherein the e-mail header includes a type of attachment and a size of attachment;

receiving the e-mail message header at the e-mail client;

detecting a connection speed between the e-mail client and the e-mail server over a communication connection;

evaluating a quality of communication connection and characteristics of the communication connection, wherein the quality of communication connection comprises an error rate for packets and a quantity of resent packets, wherein the evaluating step is performed periodically at regular intervals during the communication connection;

creating a set of message rules at the e-mail client, wherein the set of message rules includes, a predefined communication profile that includes a plurality of different connection levels that are associated with the connection speed, wherein one of the connection levels includes an unreliable connection level and a broadband connection level;

the communication profile configured to provide instructions as to how e-mail messages are to be selected, formatted, and limited according to the connection speed, a predefined file type user exception to the predefined communication profile that overrides the communication profile based on the type of attachment communication in the e-mail header, a predefined user option exception to the predefined communication profile that overrides the communication profile, wherein the user exception is based on a particular person sending the e-mail message;

selecting the set of message rules from the e-mail client and communicating the message rules to the e-mail server to specify how each e-mail is to be downloaded;

receiving header information associated with the e-mail message that is available for download;

applying the message rules using the header information to the e-mail message at the e-mail server; and instructing the e-mail server to download the e-mail message according to the applied rules; and dynamically adjusting the selecting, receiving, applying and instructing steps during e-mail download in response to the periodic evaluation during the communication connection, wherein at least one portion of the e-mail download is interrupted when the selected set of message rules indicate that the portion of the e-mail is not to be downloaded at the evaluated quality of the communication connection, the portion of the e-mail download continued when the selected set of message rules indicate that the portion of the e-mail is to be downloaded at the evaluated quality of the communication connection.

8. The method according to claim 7, wherein the message rules are defined according to the communication profile that sets download adjustments according to the speed of the communication connection.

9. The method according to claim 7, wherein the message rules are defined according to the communication profile that sets download adjustments according to the quality of the communication connection.

10. The method according to claim 7, wherein the message rules are defined according to the communication profile that sets download adjustments according to the characteristics of the communication connection.

11. The method according to claim 10, wherein the message rules use exceptions for adjusting one of the message profiles, wherein the exception includes file types.

12. The method according to claim 11, wherein the exceptions include contact classes.

13. The method according to claim 7, wherein the evaluating step is performed responsive to the e-mail client connecting to the e-mail server.

14. The method according to claim 7, wherein the user exception further comprises a particular domain name associated with the message rule.

15. A mobile wireless handset that operates as an e-mail client, comprising:
- a communication subsystem for establishing a communication connection to an e-mail server;
- a connection speed between the wireless handset and the e-mail server over the communication connection, the e-mail server having an e-mail message addressed for delivery to the e-mail client;
- a connection evaluator for evaluating a quality of communication connection and the characteristics of the communication connection, wherein the quality of communication connection comprises an error rate for packets and a quantity of resent packets, wherein the connection evaluator is configured to repeat the evaluating periodically at regular intervals during the communication connection;
- a set of message rules at the wireless handset that are applied to a plurality of e-mail messages, wherein the set of message rules include;
  - a predefined communication profile that includes a plurality of different connection levels that are associated with the connection speed, wherein one of the connection levels includes an unreliable connection level and a broadband connection level;
  - the communication profile configured to provide instructions as to how e-mail messages are to be selected, formatted, and limited according to the connection speed;
  - a predefined file type user exception to the predefined communication profile that makes exception to overrides the communication profile based on the type of attachment in the e-mail message;
  - a predefined user option module that that overrides the communication profile with at least one user exception to the predefined communication profile, wherein the user exception is based on a particular person sending the e-mail message;
  - a message evaluator disposed on the wireless handset that dynamically applies the set of message rules to available e-mail messages during e-mail download in response to the periodic evaluation during the communication connection, the message rule being selected according to the connection speed, the quality of communication connection, the communication profile, the file type user exception, and the user option module; and
- a message controller disposed on the wireless handset that dynamically instructs the e-mail server to transmit e-mail messages according to the set of message rules in response to the periodic evaluation during the communication connection, wherein at least one portion of the e-mail download is interrupted when the selected set of message rules indicate that the portion of the e-mail is not to be downloaded at the evaluated quality of the communication connection, the portion of the e-mail download continued when the selected set of message rules indicate that the portion of the e-mail is to be downloaded at the evaluated quality of the communication connection.

16. The mobile wireless handset according to claim 15, wherein the user exception further comprises a particular domain name associated with the message rule.

* * * * *